April 25, 1939.  F. G. LEAVENWORTH  2,155,903
APPARATUS FOR INDICATING THE AMOUNT
OF PRESSURE IN AUTOMOBILE TIRES
Filed Feb. 9, 1935   3 Sheets-Sheet 1
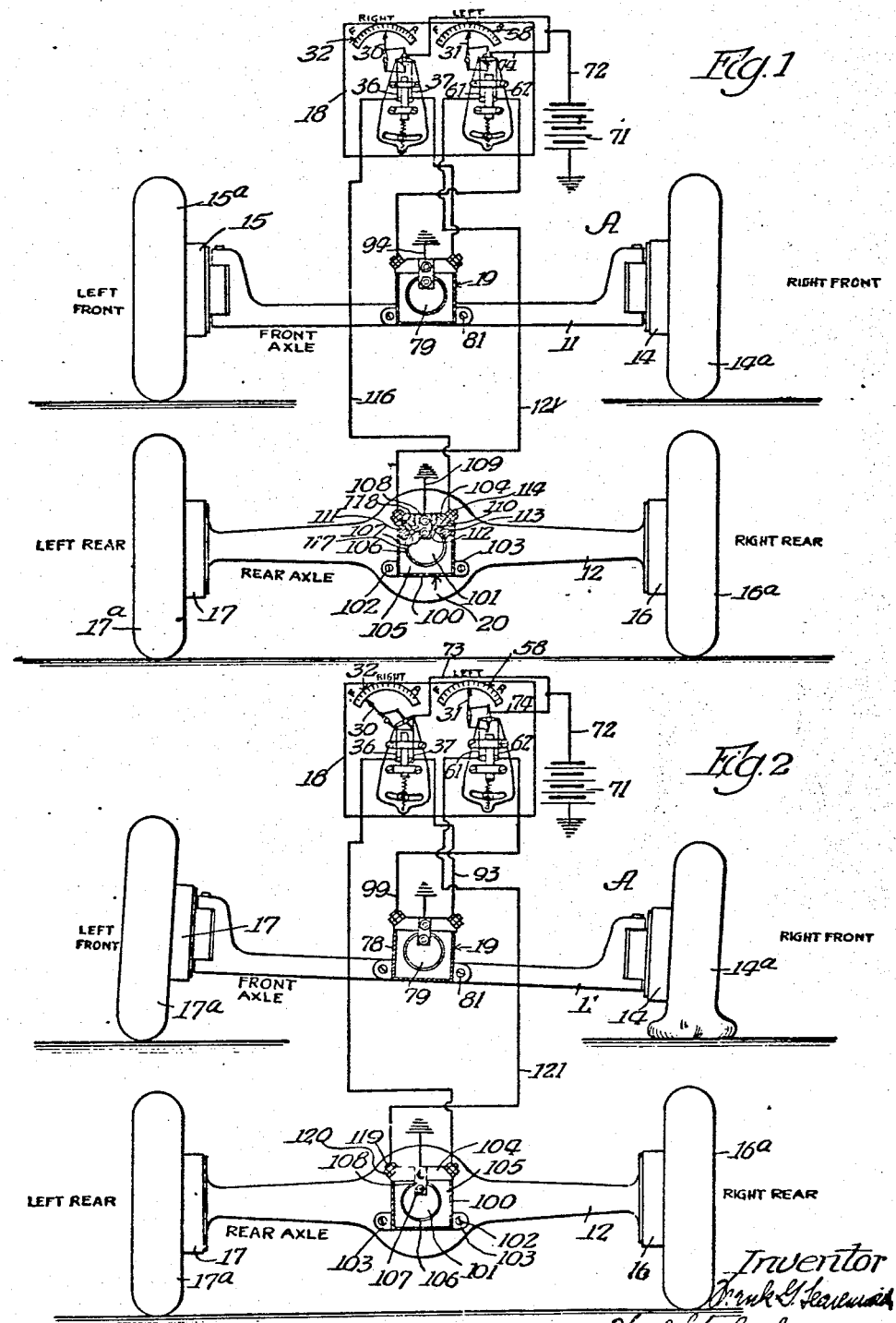

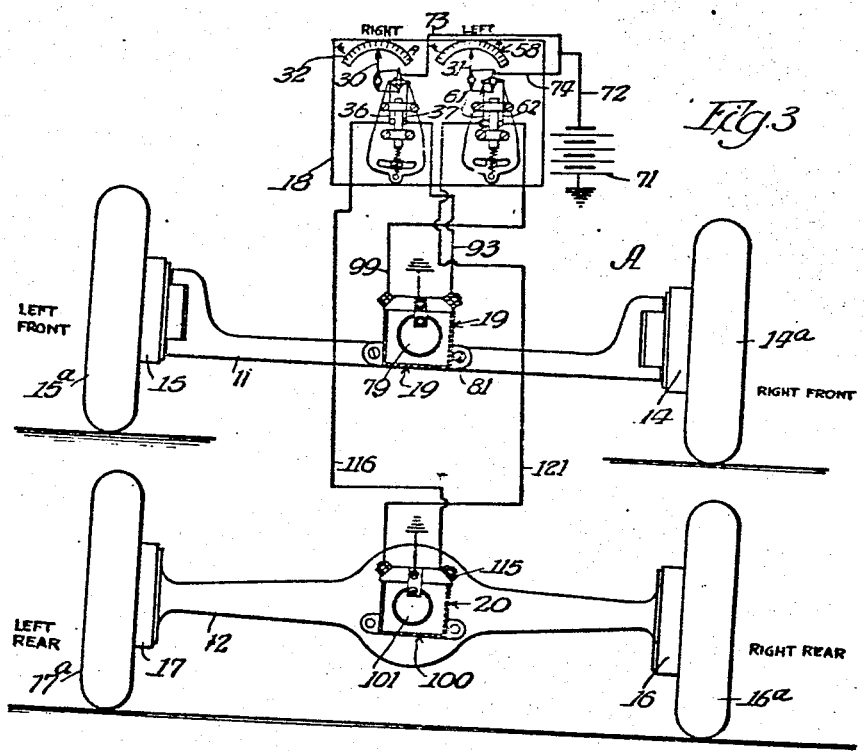

April 25, 1939.   F. G. LEAVENWORTH   2,155,903
APPARATUS FOR INDICATING THE AMOUNT
OF PRESSURE IN AUTOMOBILE TIRES
Filed Feb. 9, 1935    3 Sheets-Sheet 3

Inventor
Frank G. Leavenworth
By Fred Gerlach
his Atty.

Patented Apr. 25, 1939

2,155,903

UNITED STATES PATENT OFFICE 2,155,903

APPARATUS FOR INDICATING THE AMOUNT OF PRESSURE IN AUTOMOBILE TIRES

Frank G. Leavenworth, Oak Park, Ill., assignor to William Hartman, Chicago, Ill., trustee Application February 9, 1935, Serial No. 5,761

11 Claims. (Cl. 177—351)

The invention relates generally to apparatus for indicating or registering the amount of pressure in pneumatic tires. More particularly the invention relates to that type of pressure indicating apparatus which is designed expressly for use in connection with an automobile and comprises (1) a dashboard-mounted indicator having graduated scales and pointers for indicating the amount of pressure of the tires in use on the automobile; and (2) an actuator or actuating means for the indicator which operates automatically to move the pointers in a progressive manner with respect to the scales in response to progressive deflation of the tires and comprises a plurality of electric circuits with resistances therein and a pair of control devices which are associated respectively with the axles of the automobile and operate in response to tilting of the axles due to tire deflection to vary the resistances in the circuits.

One object of the invention is to provide an apparatus of this type which is an improvement upon and is more efficient in operation than that which forms the subject of an application for Letters Patent filed by me and Martin J. Green, October 22, 1934, Serial No. 749,364.

Another object of the invention is to provide a pressure indicating apparatus of the type under consideration in which the resistances in the electric circuits of the actuator for the indicator are in the form of carbon piles and the control devices for varying the resistances in response to tilting of the axles due to tire deflation comprise weights which are suspended and function like pendulums and are applied to the carbon piles so that they compress the latter for resistance varying purposes upon tilting of the axles.

Other objects of the invention and the various advantages and characteristics of the present pressure indicating apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals and letters of reference denote corresponding parts throughout the several views:

Figure 1 is a diagrammatic view showing a pressure indicating apparatus embodying the invention in its assembled position with respect to an automobile, and illustrating the position of the pointers of the dashboard indicator when the tires of the automobile are properly or fully inflated and the axles of the automobile are horizontally disposed;

Figure 2 is a diagrammatic view illustrating the manner in which the pointers of the indicator show tire deflation;

Figure 3 is a diagrammatic view showing the position of the pointers when the axles of the automobile are tilted sidewise in one direction as the result of the automobile being driven or parked on a laterally sloping roadway;

Figure 4 is a vertical longitudinal sectional view of one of the controlling devices which together with the electric circuits constitute the actuator or actuating means for the indicator of the apparatus;

Figure 5 is an end view of the control device of Figure 4;

Figure 6 is a vertical transverse section taken on the line 6—6 of Figure 4 and showing the manner in which the pendulum-type weights of the control devices are suspended;

Figure 7:
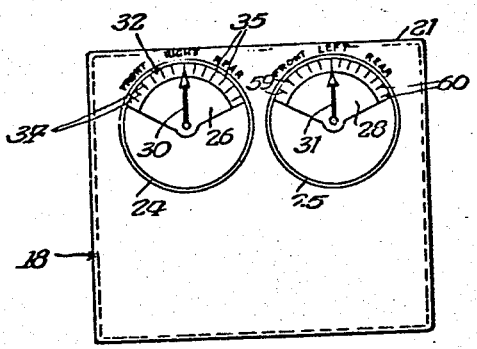
Figure 7 is a front view of the indicator.

The apparatus which is shown in the drawings constitutes the preferred embodiment of the invention. It is adapted for use in connection with an automobile A and operates to indicate or register the amount of air pressure in the tires of the automobile. The automobile is shown more or less diagrammatically in Figures 1, 2 and 3 and is supposedly of conventional or standard design or construction in that it includes a front axle 11, a rear axle 12, and a dashboard 13. The front axle is connected by springs (not shown) to the chassis of the automobile as well understood in the art, and includes a right hand dirigible wheel 14 with a pneumatic tire 14ª, and a left hand dirigible wheel 15 with a pneumatic tire 15ª. The rear axle 12 is located behind the front axle and has a right hand traction wheel 16 with a pneumatic tire 16ª, and a left hand traction wheel 17 with a pneumatic tire 17ª. The dashboard 13 constitutes a part of the body of the automobile and is supported in front of the usual seat for the driver or operator of the automobile. The pressure indicating apparatus is electrically operated and comprises an indicator 18 and an actuator or actuating means for the indicator including a pair of control devices 19 and 20.

Figure 8:
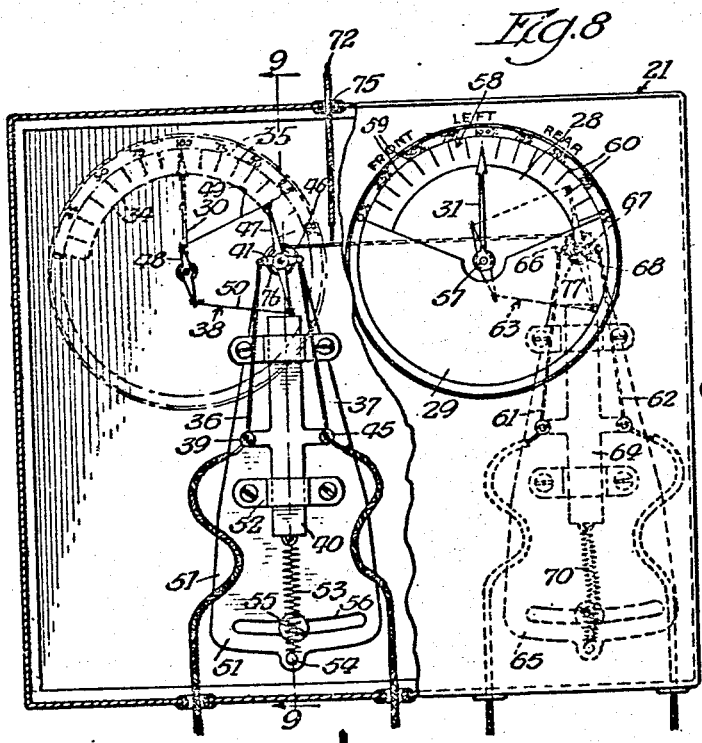
Figure 8 is an enlarged view of the indicator, parts being shown in front elevation and parts being shown in section.
Figure 9:
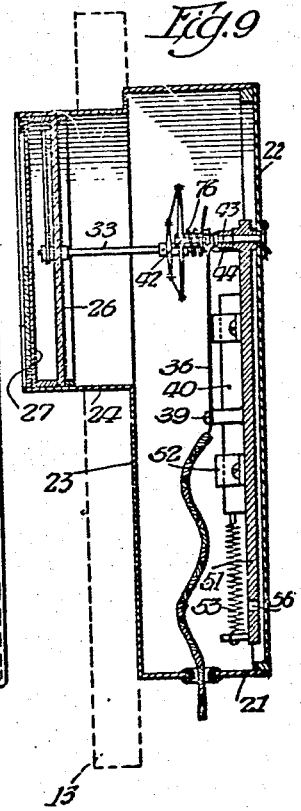
Figure 9 is a vertical transverse section of the indicator on the line 9—9 of Figure 8.
Figure 10:
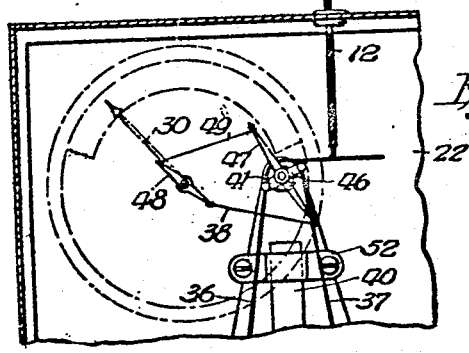
Figure 10 is a detail sectional view of the indicator showing the manner in which the pointers are moved with respect to the scales.

The indicator 18 comprises a casing 21 which is mounted against the inner face of the dashboard 13 and embodies a back wall 22 and a front wall 23. The front wall, as shown in Figure 7 of the drawings, is provided with a pair of tubular members 24 and 25. These members are positioned in side by side relation and extend through circular apertures in the dashboard so that they may be viewed from the driver's seat. The tubular member 24 has a face plate 26 in the central portion thereof and embodies a glass plate 27 across its front. The glass plate is suitably secured in place in spaced relation with respect to the face plate and permits the latter to be seen from the driver's seat of the automobile A. The tubular member 25 is the same in design and construction as the member 24 and embodies a face plate 28 and a cover plate 29. The face plate is centrally disposed in the extension 25 and the cover plate 29 is formed of glass so that he face plate is visible from a position in front of the member 25. In addition to the casing 21 the indicator 18 comprises a pair of pointers 30 and 31. The pointer 30 is associated with the tubular extension 24 of the casing 21. It is located between the face plate 26 and the glass plate 27 and coacts with an arcuate scale 32 on said face plate 26 to indicate the amount of pressure in the right front tire 14ª and the right rear tire 16ª. A shaft 33 serves as the support for the pointer 30. This shaft extends through the face plate 26 and is journalled in suitable bearings so that it is rotatable in either direction. The pointer 30 is fixedly secured to the front end of the shaft 33 and is adapted to swing back and forth relatively to the scale 32 in response to turning of the shaft. As shown in Figure 7 the scale 32 has graduations or markings 34 on the left hand side to indicate the amount of pressure in the right front tire 14ª of the automobile and has graduations or markings 35 on its right hand side to indicate the amount of pressure in the right rear tire 16ª. The pointer 30 when in a vertical position points to the central portion of the scale 32 and indicates that both the right front and right rear tires are normally or properly inflated. When the pointer swings to the left hand side of the scale, that is, over the markings 34, it indicates a decrease in pressure in the front right tire. When the pointer 30 swings in the opposite direction so that it passes over the markings 35 at the right hand side of the scale 32, it indicates a decrease in the pressure in the right rear tire 16ª. The graduations or markings 34 and 35 are preferably in the form of percentages of tire inflation so that the driver of the automobile may, by noting the position of the pointer 30 with respect to the scale 32, determine the percentage of pressure in either the right front or right rear tire as computed from the normal or proper pressure. The shaft 33 is turned in one direction or the other for pointer swinging purposes by means of a pair of fine wires 36 and 37 and a motion translating and multiplying mechanism 38. The wire 36 extends substantially vertically and is connected at its lower end to an electric terminal 39 on one side of a vertically sliding member 40. The upper end of the wire 36 is connected to the distal end of an arm 41 which is fixed to and extends radially from a sleeve 42. As shown in Figures 8 and 9 the sleeve 42 is mounted on the front end of a shaft 43 which is suitably supported in brackets 44 adjacent the back wall 22 of the casing 21. The shaft 43 is formed of any suitable insulating material so that the sleeve 42 is insulated with respect to the casing. The wire 37, like the wire 36, extends substantially vertically. The lower end of the wire 37 is connected to an electric terminal 45 on the vertical slidable member 40 and the upper end of the wire is connected to the distal end of an arm 46 on the sleeve 42. The terminal 45 is positioned directly opposite the terminal 39 and as shown in Figure 8, the arm 46 extends radially from the sleeve 42 and is positioned diametrically opposite the arm 41. The motion translating and multiplying mechanism 38 consists of a pair of levers 47 and 48 and a pair of flexible elements 49 and 50. The lever 47 extends substantially vertically and is provided with a hub at the central portion thereof whereby it is fixed to the sleeve 42. The lever 48 extends parallel to and is materially shorter than the lever 47 and has a central hub whereby it is fixedly secured to the central portion of the shaft 33. The flexible element 49 extends between and is attached to the upper ends of the levers 47 and 48 and the flexible element 50 extends between and is connected to the lower ends of said levers. When the sleeve 42 is turned in one direction or the other the pointer carrying shaft 33 is turned correspondingly. By reason of the fact that the lever 48 is shorter than the lever 47 the shaft 33 is turned to a greater extent than the sleeve 42. The wires 36 and 37 are formed of Nichrome or like material and are adapted as hereinafter described, to have current passed through them for pointer shifting purposes. When current is passed through the wire 37, the wire due to its fineness becomes heated and lengthens. In response to lengthening of the wire 37, the sleeve 42 is turned in one direction and this turning movement through the medium of the motion translating and multiplying mechanism 38 is transmitted to the shaft 33 and the latter operates to swing the pointer 30 toward the left hand side of the scale 32. When current is passed through the wire 36 the latter becomes heated and lengthens with the result that the sleeve 42 is turned and the mechanism 38 is actuated so as to cause the pointer 30 to swing towards the right hand side of the scale 32. The member 40 is formed of insulating material and is mounted for vertical sliding movement between a plate 51 and a pair of brackets 52. The plate extends vertically and is pivoted at its upper end to the shaft 42 so that it is free to swing sidewise to a limited extent. The brackets 52 are suitably secured to the front face of the plate 51 and, as shown in Figure 8, are positioned one above the other. A tension spring 53 extends between and is connected to the lower end of the member 40 and a pin 54 on the bottom of the plate 51. This spring urges the member 40 downwardly so that the Nichrome wires 36 and 37 are kept taut at all times. When current is passed through one of the wires so that it lengthens, the member 40 slides downwardly due to the action of the spring 53 and through the medium of the other wire which is shorter than the wire through which the current is passed causes the sleeve 42 to turn on the shaft 43, as shown in Figure 10 of the drawings. The amount of turning of the sleeve depends upon the amount of lengthening of the Nichrome wire and this depends upon the amount of current which is caused to flow through the wire. By swinging the plate 51 the pointer may be regulated with respect to the scale 32 so that it normally assumes a zero or vertical position, that is it extends vertically when no current is passed through either of the wires 36 and 37 and the latter are equal in length. A screw 55 extends through an arcuate slot 56 in the lower portion of the plate 51 and serves to hold the plate in place after adjustment thereof for pointer regulating purposes. When the screw is loosened the plate may be swung to one side or the other and the pointer 30 thus adjusted. Upon tightening the screw after proper positioning of the plate, the plate is securely held in place.

The pointer 31 is associated with the tubular extension 25 of the casing 21 and is located between the face plate 28 and the cover plate 29. It is connected to and projects radially from the front end of a horizontally extending rock shaft 57 and coacts with a scale 58 to indicate the amount of pressure in the left front tire 15ª and the left rear tire 17ª of the automobile A. The rock shaft 57 is journalled in suitable bearings in the casing 21 and serves in response to rocking thereof to swing the pointer 31 back and forth relatively to the scale 58. The left hand side of the scale has graduations or markings 59 which indicate the amount of pressure in the left front tire 15ª and the right hand side of the scale has graduations or markings 60 for indicating the amount of pressure in the left rear tire 17ª. The pointer, when in a vertical position, points to the central portion of the scale 58 and indicates that both the left front and left rear tires are under normal or proper air pressure. Rocking of the shaft 57 for pointer swinging purposes is effected by means of a pair of Nichrome wires 61 and 62 and a motion translating and multiplying mechanism 63. The wires 61 and 62 function similarly to the wires 36 and 37 and are connected at their lower ends to a pair of electric terminals on a vertically slidable member 64. The latter fits against the plate 65 and is confined for vertical slidable movement by means of a pair of brackets on the plate. The upper ends of the wires 61 and 62 are connected to a pair of oppositely extending arms 66 and 67 on a sleeve 68. The sleeve is mounted on the front end of a shaft 69 which is formed of insulating material and serves as a pivotal support for the upper end of the plate 65. The motion translating and multiplying mechanism 63 is similar in design and mode of operation to the mechanism 38 and operates to swing the pointer 31 when either of the wires 61 and 62 is lengthened as the result of current passing therethrough. When current is supplied to the wire 62 so that the latter lengthens the mechanism 63 operates through the medium of the shaft 57 to swing the pointer 31 over the left hand side of the scale 58 and when current is supplied to the wire 61 so that it lengthens the aforesaid mechanism serves to swing the pointer 31 over the right hand side of the scale 58. The member 64 is formed of insulating material and is normally urged downwards by means of a tension spring 70.

Current is supplied to the wires 36 and 37 for the pointer 30 and the wires 61 and 62 for the pointer 31 from a battery 71, which preferably is the storage battery of the automobile A. A conductor 72 leads from one side of the battery to a pair of branch conductors 73 and 74. As shown in Figure 8, the conductor 72 extends into the casing 21 through an aperture 75 in the top wall of the casing, and the branch conductors 73 and 74 are disposed in the casing. The branch conductor 73 is connected by a coil spring 76 to the sleeve 42 and the conductor 74 is connected by a coil spring 77 to the sleeve 68. The coil springs 76 and 77 serve as contact means and at the same time permit of ready or free swinging of the sleeves. The flow of current through the Nichrome wires 36, 37, 61 and 62 is controlled by the devices 19 and 20.

The controlling device 19 is associated with the front axle 11 of the automobile A and comprises a box-like housing 78 and a weight 79. The housing, as shown in the drawings, has an open top and embodies a pair of laterally extending ears 80. These ears are apertured so as to receive bolts 81 which serve to secure the housing in fixed relation with respect to the central portion of the axle 11. The top of the housing is closed by a cover 82 which is formed of fiber or any other suitable insulating material and is locked or held in place in any desired manner. A partition 83 is formed integrally with and depends from the cover 82. This partition is spaced from the front and rear walls of the housing 78, as shown in Figure 6, and has an aperture 84 in the central portion thereof. The aperture extends completely through the partition and is circular. The weight 79 is formed of metal such as brass or any like conducting material and is in the form of a disk which fits within but is slightly smaller in diameter than the aperture 84. A bolt 85 extends through the upper portion of the weight and serves as a pivotal support whereby the weight is hung or suspended for operation like a pendulum. As shown in Figure 6 the bolt 85 extends through and is carried by a pair of metal strips 86 which depend from the cover 82 and are connected to the latter by a bolt 87. The strips 86 fit within grooves 87ª in the side faces of the cover so that they are spaced inwardly from and art out of contact with the front and rear walls of the housing 76. The ends of the cover 82 of the housing are cut or formed so that they have flat faces which extend at approximately an angle of 45° with respect to the horizontal. A bore 88 is formed in the cover so that it extends through and at right angles to one of the angled end faces. This bore 88 passes downwardly and inwardly through the partition 83 so that it intersects and communicates with the upper portion of the aperture 84. A plunger 89 and a carbon pile 90 are mounted in the inner end of the bore. The plunger is formed of metal and rests upon the upper portion of the weight 79, as shown in Figure 4. The carbon pile consists of a series or set of carbon disks and is disposed in the bore between the plunger 89 and a screw 91. The upper or outer portion of the bore 88 is formed with a female or internal screw thread to receive the screw and cause the screw when it is turned to move longitudinally of the bore. The upper end of the screw projects beyond the cover and is provided with a pair of nuts 92. These nuts serve to hold the screw in place after adjustment thereof within the bore and form a binding post for one end of a conductor 93. The other end of this conductor extends into the housing 21 of the indicator and is attached to the electric terminal 39. When the carbon pile is in contact with the inner end of the screw 91 the following circuit is established: battery 71, conductor 72, branch conductor 73, coil spring 76, sleeve 42, arm 46, Nichrome wire 37, conductor 93, screw 91, carbon pile 90, plunger 89 and weight 79. The weight is grounded by means of a wire 94 which leads from the bolt 87. When the aforementioned circuit is established, the Nichrome wire 37, due to flow of current therethrough, becomes heated and as previously pointed out, due to the increase in length thereof, causes the pointer 30 to swing to the left hand side of the scale 34. The carbon pile 90 is in the nature of a variable resistance which when the disks thereof rest loosely one on top of the other offers a maximum resistance to the flow of current through the aforementioned circuit. When the pile is compressed the resistance in the circuit is decreased. Compression of the carbon pile 90 is effected by the weight 79. When the front axle 11 tilts downwardly as the result of deflation of the right front tire 14ᵃ the weight 79 forces upwardly the plunger 89 so as to compress the carbon pile. As downward tilting of the axle increases the pressure of the weight 79 against the plunger 89 with the result that the carbon pile is compressed to a greater extent. When the axle 11 is horizontal as the result of proper or normal inflation of the two tires, the weight 79 exerts no pressure on the plunger 89 and the carbon pile, as a result, offers maximum resistance to the flow of current through the circuit. The resistance is preferably such that the flow of current is substantially negligible with the result that there is no increase in length of the Nichrome wire 37. When the axle 11 tilts downwardly to a small extent due to partial deflation of the right front tire 14ᵃ, the carbon pile is compressed to a small extent and permits of the flow of sufficient current through the wire 37 to cause the pointer 30 to deflect or move to a small or limited extent over the left hand side of the scale 32. As the compression of the carbon pile increases due to increased downward tilting of the axle the resistance is progressively decreased with the result that the current flows in increased amount through the Nichrome wire and causes a progressive movement of the pointer 30 with respect to the graduations or markings 34 on the scale 32. Because of the action of the carbon pile and the weight 79, the degree of tilting of the front axle 11 in response to deflation of the left front tire 15ᵃ determines the amount of deflection of the pointer 30. The graduations or markings 34 are preferably made so that the pointer indicates on the scale a zero percentage of air in the tire 14ᵃ, when the pointer is shifted to the extreme left hand side of the scale. Because the lengthening of the Nichrome wire 37 is not instantaneous during the passage of current therethrough, the pointer 30 is not deflected when the right front wheel 14 enters a depression or hole in the roadway and the weight 79 as a result effects a momentary compression of the carbon pile 90. The carbon pile constitutes a simple form of resistance for controlling the flow of current through the Nichrome wire 37 and the pendulum-like weight 79 constitutes a simple medium for controlling the carbon pile so that it is compressed in increasing amounts in response to progressive deflation of the tire 14ᵃ. By so controlling the carbon pile the flow of current through the Nichrome wire 37 is regulated so that the deflection or movement of the pointer 30 with respect to the left hand side of the scale 32 is in direct proportion to the degree or amount of tilt of the axle 11 as the result of tire deflation.

The cover 82 for the housing 78 is provided with a bore 94 at the end thereof opposite the bore 88. This bore 94 extends downwardly and inwardly at an angle of approximately 45° and intersects the aperture 84. A plunger 95 and a carbon pile 96 are mounted in the inner end of the bore 94. The plunger is formed of metal and rests upon the upper portion of the weight 79. The carbon pile 90 is formed of a series or set of carbon disks and serves as a resistance. It is disposed in the bore between the plunger 95 and a screw 97 and is subject to compression between the screw and the plunger 95 as the result of the action of the weight 79 during tilting of the front axle 11 of the automobile as the result of deflation of the left front tire 15ᵃ. The outer end of the bore 94 embodies a female or internal screw thread for the screw 97 so that the screw may be adjusted to regulate the normal pressure of the plunger against the pile when the weight 79 is central with respect to the housing of the controlling device 19. The outer end of the screw 97 projects beyond the bore 94 and is provided with a pair of locking nuts 98. These nuts serve to lock the screw in its different adjusted positions and form a terminal or binding post for one end of a conductor 99. The other end of this conductor, as shown in the drawings, extends into the casing 21 and is attached to the electric terminal at the lower end of the Nichrome wire 62. Normally the carbon disks of the pile 96 offer such resistance that little if any current flows through the Nichrome wire 62. When the pile is compressed as the result of downward tilting of the front axle 11 due to deflation of the left front tire 15ᵃ the following circuit is established: battery 71, conductor 72, branch conductor 74, coil spring 77, sleeve 68, Nichrome wire 62, conductor 99, carbon pile 96, plunger 95, weight 79 and ground wire 94. The flow of current through this circuit is controlled by the amount of compression of the pile resulting from the action of the weight 79. When the front axle is tilted downward to a small extent as the result of but a small degree of deflation of the left front tire 15ᵃ, the carbon pile is compressed to but a small extent and as a result offers such resistance to the flow of current through the Nichrome wire 62 that the wire is heated to but a small extent and as a result there is only a small deflection or movement of the pointer 31 over the left hand side of the scale 58. When the carbon pile is compressed to a greater extent as the result of being subjected to greater pressure by the weight 79 because of an increased downward tilting of the axle 11 in the direction of the left front tire 15ᵃ a greater amount of current passes through the Nichrome wire 62 and the latter, because of a further increase in its length, deflects or moves the pointer 31 to a greater extent over the left hand side of the scale 58. Because of the action of the carbon pile and the weight, the Nichrome wire 62 operates to move the pointer in a progressive manner with respect to the graduations or markings 59 in response to progressive deflation of the left front tire 15ᵃ and the pointer together with the markings shows or indicates the degree of deflation of said tire 15ᵃ.

The controlling device 20 is associated with the rear axle 12 of the automobile A and is the same in design and construction as the controlling device 19. It comprises a housing 100 and a weight 101 and is secured to the central portion of the rear axle by means of bolts 102 which extend through apertured ears 103 on the lower portion of the housing. The housing, as shown in the drawings, is box-like in character and is closed at the top thereof by means of a cover 104. The latter is formed of insulating material and is provided with an integral depending partition 105 which has a central circular aperture 106 for the weight 101. The weight is preferably formed of brass and is in the form of a disk which is the same in thickness as the partition 105, but is slightly smaller in diameter than the aperture 106. A bolt 107 is supported by a pair of metal strips 108 and serves as a pivotal support whereby the weight 101 is hung or supported like a pendulum. The strips 108, as shown in the drawings, are attached to the cover 104 of the casing 100 and are connected to a ground wire 109. One end of a cover is bored inwardly and downwardly to form a bore 110 and the other end of the cover is bored inwardly and downwardly in the direction of the circular aperture 106 to form a bore 111. A plunger 112, a carbon pile 113, and a screw 114, are disposed in the bore 110. The screw is secured in place by means of nuts 115 and is connected by a conductor 116 to the electric terminal 39 at the lower end of the Nichrome wire 36. The carbon pile 113 functions as a resistance for the conductor 116 and operates in the same manner as the carbon piles 90 and 96. The circuit for the wire 36 is as follows: battery 71, conductor 72, branch conductor 73, coil spring 76, sleeve 42, arm 41, Nichrome wire 36, conductor 116, screw 114, carbon pile 113, plunger 112, weight 101 and ground wire 109. When the rear axle 12 extends horizontally or there is no downward inclination of the axle as the result of any deflation of the right rear tire 16ª, the carbon pile 113 offers such resistance to the flow of current through the conductor 116 that there is no lengthening of the wire 36 relatively to the wire 37 and the pointer 30 does not move over the right hand side of the scale 32. When the rear axle tilts downwardly in response to deflation of the right rear tire 16ª the carbon pile 113 is compressed as a result of the action of the weight 101 and the plunger 112. Compression of the pile 113 results in a decrease in the resistance and an increased flow of current through the conductor 116. This increase in flow of current in turn causes the wire 36 to heat and lengthen and the pointer 30 to swing to the right hand side of the scale 32. As the rear axle 12 tilts progressively downwardly due to progressive deflation of the right rear tire 16ª the resistance afforded by the carbon pile is progressively decreased and the pointer swings progressively to the right hand side of the scale 32. The amount of pressure in the right rear tire or the degree of deflation of the latter is represented or determined by the position of the pointer 30 with respect to the graduations or markings 35 on the scale 32.

A plunger 117, a carbon pile 118, and a screw 119 are disposed in the bore 111. The plunger 117 rests on the upper portion of the weight 101 and serves in response to the action of the weight 101 due to downward tilting of the rear axle 12 in the direction of the wheel 17 to compress the carbon pile 118 against the inner end of the screw 119. The screw 119 is secured in place by means of a pair of lock nuts 120, and is connected by a conductor 121 to the electric terminal at the lower end of the Nichrome wire 61. The carbon pile 113 serves as a variable resistance for the following circuit for the wire 61: battery 71, conductor 72, branch conductor 74, coil spring 77, sleeve 68, Nichrome wire 61, conductor 121, screw 119, carbon pile 118, plunger 117, weight 101 and ground wire 109. When the rear axle 12 tilts downwardly due to deflation of the left rear tire 17 the carbon pile 118 is compressed so that current flows through the aforementioned circuit to cause the Nichrome wire 61 to lengthen as the result of heating, and to move or deflect the pointer 31 over the right hand side of the scale 58. As the rear axle 12 progressively tilts downwardly in response to progressive deflation of the left rear tire 17ª the carbon pile is progressively compressed as the result of the action of the weight 101 and offers a decreasing resistance to the circuit through the wire so that the wire progressively lengthens and moves the pointer 31 in a progressive manner toward the right hand end of the scale 58. The carbon pile is controlled so that the pointer 30 moves over the graduations or markings 60 in direct proportion to the amount of deflation of the left rear tire 17ª. Because of such control of the carbon pile 118 the portion of the pointer 31 with respect to the aforesaid graduations or markings 60 shows the amount of air pressure in the tire 17ª.

If the automobile A is driven over a roadway which slants in the direction of the right front and rear wheels 15 and 17 there is no deflection of the pointer 31 with respect to the graduations or markings 59 and 60 on the scale 58 inasmuch as current is caused to pass and flow through the Nichrome wires 61 and 62 so that the two wires lengthen uniformly. Likewise if the automobile A is driven over a roadway which slants in the direction of the right front and rear wheels 14 and 16 (see Figure 3) there is no deflection of the pointer 30 with respect to the scale 32 inasmuch as the controlling devices 19 and 20 operate the carbon piles 90 and 113 so that an equal amount of current passes through the Nichrome wires 37 and 36 and the two wires lengthen uniformly.

The operation of the apparatus is as follows: When all four tires of the automobile are fully inflated as shown in Figure 1, the axles 11 and 12 are horizontally disposed and there is no deflection of the pointers with respect to the right and left hand sides of the scales 32 and 58. In the event of puncture or deflation of the right front tire 14ª (see Figure 2) the front axle 11 tilts downwardly in the direction of the wheel 14 and causes the housing 18 to tilt so that the weight 79, through the medium of the plunger 89 compresses the carbon pile 90. As this carbon pile compresses, the resistance in the circuit for the Nichrome wire 37 decreases so that the increased flow of current through the wire causes it to heat and lengthen and as a result to swing the pointer 30 to the left hand side of the scale 32 to such a position with respect to the graduations or markings 34 that it indicates the degree of deflation of the front right tire 14ª. When the left front tire is punctured so that the axle 11 tilts in the opposite direction the pointer 31 because of the increased flow of current through the circuit for the Nichrome wire 62 swings toward the left hand side of the scale 58, and registers the deflated condition of the tire on the graduations or markings 59. In the event of deflation of the right rear tire 16ª, the pointer 30 swings to the right and indicates the degree of deflation on the graduations or markings 35 of the scale 32. Likewise when the left rear tire 17ª is punctured or otherwise becomes deflated the condition of the tire is recorded or indicated by swinging of the pointer 31 toward the right hand end of the scale 58.

The herein described apparatus is comparatively simple as far as construction is concerned and may be manufactured at a low and reasonable cost. It is extremely efficient in operation because of the accuracy of the indicator 18 and will not give a false reading in the event that the axles 11 and 12 are tilted due to the automobile A being driven on an inclined or laterally sloping roadway. Because the pointers 30 and 31 are subject to the action of the slowly heating and distending or lengthening Nichrome wires 36, 37, 61 and 62, they do not swing from their normal position when either of the axles is tilted in one direction or the other as the result of the automobile being driven over a rough roadway.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with a vehicle having wheels with pneumatic tires thereon, of a tire indicator mounted on the vehicle and provided with means for indicating the various degrees of deflation of the tires, and means for actuating said indicating means including electric circuits with compressible-type, variable resistances therein, and devices controlled by tilting due to tire deflation for compressing said resistances.

2. The combination with an automobile having axles and wheels on the axles with pneumatic tires thereon, of a tire indicator mounted on the automobile and provided with means for indicating the various degrees of deflation of the tires, and means for actuating said indicating means comprising a source of electric current, a plurality of circuits supplied with current from said source of current and having compressible-type, variable resistances therein, and devices controlled by tilting of the axles due to tire deflation for compressing the resistances to vary the flow of current through said circuits.

3. The combination with a vehicle having wheels with pneumatic tires thereon, of an indicator mounted on the vehicle provided with means for indicating the various degrees of deflation of the tires, and means for actuating said indicating means including electric circuits with variable resistances therein, and weighted elements pivotally supported on the vehicle to swing transversely thereof and operative in response to tilting of said vehicle due to tire deflation to vary the resistances.

4. The combination with a vehicle having a front and rear axle and wheels on the axles with pneumatic tires thereon, of a tire indicator mounted on the vehicle so that it is visible from the driver's seat and provided with means for indicating deflation of each tire, and means for automatically actuating the indicating means including an electric circuit for each means with a variable resistance therein, and a pair of weighted, pendulum-like elements associated with the axles respectively, and arranged and pivoted so that they swing lengthwise of the axles and operate in response to tilting of the axles in one direction due to deflation of the tires at one side of the vehicle to vary the resistances in certain of the circuits and in response to tilting of the axles in the other direction due to deflation of the tires at the other side of the vehicle to vary the resistances in the other circuits.

5. The combination with a vehicle having a front and rear axle and wheels on the axles with pneumatic tires thereon, of a tire indicator mounted on the vehicle so that it is visible from the driver's seat and provided with means for indicating the various degrees of deflation of each tire, and means for automatically actuating said indicating means including an electric circuit for each means with a variable resistance therein, and a pair of weighted, pendulum-like elements associated with the axles respectively and arranged and pivoted so that they swing lengthwise of the axles and operate in response to progressive tilting of the axles in one direction due to deflation of the tires at one side of the vehicle to vary progressively the resistances in certain of the circuits and in response to progressive tilting of the axles in the other direction due to deflation of the tires at the other side of the vehicle to vary progressively the resistances in the other circuits.

6. The combination with a vehicle having a front and rear axle and wheels on the axles with pneumatic tires thereon, of a tire indicator mounted on the vehicle so that it is visible from the driver's seat and provided with means for indicating deflation of each tire, and means for automatically actuating said indicating means including an electric circuit for each means with a variable resistance therein in the form of a carbon pile, and a pair of control elements associated with the axles respectively and arranged and mounted so that they are movable lengthwise of the axles and operate in response to tilting of the axles in one direction due to deflation of the tires at one side of the vehicle to compress the carbon piles in certain of the circuits, and in response to tilting of the axles in the other direction due to deflation of the tires at the other side of the vehicle to compress the carbon piles in the other circuits.

7. The combination with a vehicle having a front and rear axle and wheels on the axles with pneumatic tires thereon, of a tire indicator mounted on the vehicle so that it is visible from the driver's seat and provided with means for indicating deflation of each tire, and means for automatically actuating said indicating means including an electric circuit for each means with a variable resistance therein in the form of a carbon pile, and a pair of weighted, pendulum-like elements associated with the axles respectively and arranged and pivoted so that they swing lengthwise of the axles and operate in response to tilting of the axles in one direction due to deflation of the tires at one side of the vehicle to compress the carbon piles in certain of the circuits, and in response to tilting of the axles in the other direction due to deflation of the tires at the other side of the vehicle to compress the carbon piles in the other circuits.

8. The combination with a vehicle having a front and rear axle and wheels on the axles with pneumatic tires thereon, of a tire indicator mounted on the vehicle so that it is visible from the driver's seat and provided with means for indicating the various degrees of deflation of each tire, and means for automatically actuating the indicating means comprising an electric circuit for each means with a variable resistance therein in the form of a carbon pile, and a pair of weighted, pendulum-like elements mounted on the axles respectively and arranged and pivoted so that they swing lengthwise of the axles and operate in response to progressive tilting of the axles in one direction due to deflation of the tires at one side of the vehicle to compress progressively the carbon piles in certain of the circuits and in response to progressive tilting of the axles in the other direction due to deflation of the tires at the other side of the vehicle to compress progressively the carbon piles in the other circuits.

9. The combination with a vehicle having a cross axle and wheels on the ends of the axle with pneumatic tires thereon, of a tire indicator mounted on the vehicle so that it is visible from the driver's seat and provided with means for indicating the various degrees of deflation of one of the tires and also provided with means for indicating the various degrees of deflation of the other tire, and means for automatically actuating the indicator comprising an electrical control circuit with a variable resistance therein for the first mentioned indicating means, an electrical control circuit with a variable resistance therein for the second mentioned indicating means, and a weighted, pendulum-like element associated with and mounted to swing longitudinally of the axle and arranged so that in response to progressive tilting of the axle in one direction due to deflation of said one tire it progressively varies the resistance in said first mentioned circuit and also arranged so that in response to progressive tilting of the axle in the opposite direction due to deflation of said other tire it progressively varies the resistance in the second mentioned control circuit.

10. The combination with a vehicle having a cross axle and wheels on the ends of the axle with pneumatic tires thereon, of a tire indicator mounted on the vehicle so that it is visible from the driver's seat and provided with means for indicating the various degrees of deflation of one of the tires and also provided with means for indicating the various degrees of deflation of the other tire, and means for automatically actuating the indicator comprising an electrical circuit adapted to control the first mentioned indicating means and having a compressible type, variable resistance therein mounted on the axle, an electrical circuit adapted to control the second mentioned indicating means and having a compressible type, variable resistance therein mounted also on the axle, and a weighted, pendulum-like element mounted on the axle between the two resistances and so as to swing lengthwise of the axle and arranged so that in response to progressive tilting of the axle in one direction due to deflation of said one tire it progressively compresses the resistance in the first mentioned circuit and also arranged so that in response to progressive tilting of the axle in the opposite direction due to deflation of said other tire it progressively compresses the resistance in the second mentioned circuit.

11. The combination with a vehicle having a front and rear axle and wheels on the ends of the axles with pneumatic tires thereon, of a tire indicator mounted on the vehicle so that it may be viewed from the driver's seat and comprising a graduated scale and a coacting pointer adapted when moved in one direction relatively to the scale to indicate the various degrees of deflation of the front tire at one side of the vehicle and adapted when moved in the other direction relatively to the scale to indicate the various degrees of deflation of the rear tire at said one side of the vehicle; means for progressively moving the pointer in said one direction in response to progressive deflation of said one front tire comprising an electric circuit with a variable resistance therein, and a weighted, pendulum-like element associated with and mounted to swing lengthwise of the front axle and operative in response to tilting of said axle relatively to the rear axle and due to deflation of said front tire to vary the resistance; and means for progressively moving the pointer in said other direction in response to progressive deflation of said one rear tire comprising an electric circuit with a variable resistance therein, and a weighted, pendulum-like element associated with and mounted to swing lengthwise of the rear axle and operative in response to tilting of said rear axle relatively to the front axle and due to deflation of said one rear tire to vary the last mentioned resistance.

FRANK G. LEAVENWORTH.